United States Patent
Meier et al.

(10) Patent No.: US 9,600,289 B2
(45) Date of Patent: Mar. 21, 2017

(54) LOAD-STORE DEPENDENCY PREDICTOR PC HASHING

(75) Inventors: Stephan G. Meier, Los Altos, CA (US); John H. Mylius, Gilroy, CA (US); Gerard R. Williams, III, Los Altos, CA (US); Suparn Vats, Fremont, CA (US)

(73) Assignee: Apple Inc., Cupertino, CA (US)

( * ) Notice: Subject to any disclaimer, the term of this patent is extended or adjusted under 35 U.S.C. 154(b) by 692 days.

(21) Appl. No.: 13/483,268

(22) Filed: May 30, 2012

(65) Prior Publication Data
US 2013/0326198 A1    Dec. 5, 2013

(51) Int. Cl.
| | |
|---|---|
| *G06F 12/1018* | (2016.01) |
| *G06F 12/0864* | (2016.01) |
| *G06F 17/30* | (2006.01) |
| *G06F 9/38* | (2006.01) |
| *G06F 12/08* | (2016.01) |
| *G06F 12/10* | (2016.01) |

(52) U.S. Cl.
CPC .......... *G06F 9/3834* (2013.01); *G06F 9/3838* (2013.01); *G06F 12/0864* (2013.01); *G06F 12/1018* (2013.01); *G06F 17/30949* (2013.01)

(58) Field of Classification Search
CPC ............... G06F 9/3834; G06F 12/1018; G06F 12/0864; G06F 17/30949
See application file for complete search history.

(56) References Cited

U.S. PATENT DOCUMENTS

| | | | |
|---|---|---|---|
| 4,521,851 A | 6/1985 | Trubisky et al. | |
| 4,594,660 A | 6/1986 | Guenthner et al. | |
| 4,860,199 A * | 8/1989 | Langendorf et al. | ......... 711/213 |
| 5,276,825 A | 1/1994 | Blomgren et al. | |
| 5,404,470 A | 4/1995 | Miyake | |
| 5,440,752 A | 8/1995 | Lentz et al. | |
| 5,465,336 A | 11/1995 | Imai et al. | |

(Continued)

FOREIGN PATENT DOCUMENTS

| | | |
|---|---|---|
| CN | 1415088 A | 4/2003 |
| EP | 0651323 A1 | 5/1995 |

(Continued)

OTHER PUBLICATIONS

Tariq Jamil, Ram versus Cam, 1997, IEEE, 0278-6648/97, pp. 26-29, retrieved on Mar. 11, 2010 from IEEExplore.*

(Continued)

*Primary Examiner* — Andrew Caldwell
*Assistant Examiner* — Jyoti Mehta
(74) *Attorney, Agent, or Firm* — Rory D. Rankin; Meyertons, Hood, Kivlin, Kowert & Goetzel, P.C.

(57) ABSTRACT

Methods and processors for managing load-store dependencies in an out-of-order instruction pipeline. A load store dependency predictor includes a table for storing entries for load-store pairs that have been found to be dependent and execute out of order. Each entry in the table includes hashed values to identify load and store operations. When a load or store operation is detected, the PC and an architectural register number are used to create a hashed value that can be used to uniquely identify the operation. Then, the load store dependency predictor table is searched for any matching entries with the same hashed value.

15 Claims, 10 Drawing Sheets

(56) References Cited

U.S. PATENT DOCUMENTS

| | | | |
|---|---|---|---|
| 5,467,473 A | 11/1995 | Kahle et al. | |
| 5,471,598 A | 11/1995 | Quattromani et al. | |
| 5,475,823 A | 12/1995 | Amerson et al. | |
| 5,487,156 A | 1/1996 | Popescu et al. | |
| 5,490,259 A | 2/1996 | Hiraoka et al. | |
| 5,557,763 A | 9/1996 | Senter et al. | |
| 5,606,670 A | 2/1997 | Abramson et al. | |
| 5,619,662 A | 4/1997 | Steely, Jr. et al. | |
| 5,625,789 A * | 4/1997 | Hesson et al. | 712/217 |
| 5,625,835 A | 4/1997 | Ebcioglu et al. | |
| 5,651,125 A | 7/1997 | Witt et al. | |
| 5,652,859 A | 7/1997 | Mulla et al. | |
| 5,666,506 A | 9/1997 | Hesson et al. | |
| 5,710,902 A | 1/1998 | Sheaffer et al. | |
| 5,717,883 A | 2/1998 | Sager | |
| 5,742,791 A | 4/1998 | Mahalingaiah et al. | |
| 5,748,978 A | 5/1998 | Narayan et al. | |
| 5,751,983 A | 5/1998 | Abramson et al. | |
| 5,754,812 A | 5/1998 | Favor et al. | |
| 5,761,712 A | 6/1998 | Tran et al. | |
| 5,768,555 A | 6/1998 | Tran et al. | |
| 5,781,752 A | 7/1998 | Moshovos et al. | |
| 5,781,790 A | 7/1998 | Abramson et al. | |
| 5,799,165 A | 8/1998 | Favor et al. | |
| 5,802,588 A | 9/1998 | Ramagopal et al. | |
| 5,822,559 A | 10/1998 | Narayan et al. | |
| 5,832,297 A | 11/1998 | Ramagopal et al. | |
| 5,835,747 A | 11/1998 | Trull | |
| 5,850,533 A | 12/1998 | Panwar et al. | |
| 5,884,060 A | 3/1999 | Vegesna et al. | |
| 5,884,061 A | 3/1999 | Hesson et al. | |
| 5,887,152 A | 3/1999 | Tran | |
| 5,923,862 A | 7/1999 | Nguyen et al. | |
| 5,996,068 A | 11/1999 | Dwyer, III et al. | |
| 6,016,540 A | 1/2000 | Zaidi et al. | |
| 6,021,485 A | 2/2000 | Feiste et al. | |
| 6,108,770 A * | 8/2000 | Chrysos et al. | 712/216 |
| 6,122,727 A | 9/2000 | Witt | |
| 6,141,747 A | 10/2000 | Witt | |
| 6,212,622 B1 | 4/2001 | Witt | |
| 6,212,623 B1 | 4/2001 | Witt | |
| 6,266,744 B1 | 7/2001 | Hughes et al. | |
| 6,393,536 B1 | 5/2002 | Hughes et al. | |
| 6,481,251 B1 | 11/2002 | Meier et al. | |
| 6,502,185 B1 | 12/2002 | Keller et al. | |
| 6,523,109 B1 | 2/2003 | Meier | |
| 6,542,984 B1 | 4/2003 | Keller et al. | |
| 6,571,318 B1 | 5/2003 | Sander et al. | |
| 6,622,237 B1 | 9/2003 | Keller et al. | |
| 6,625,723 B1 | 9/2003 | Jourday et al. | |
| 6,651,161 B1 | 11/2003 | Keller et al. | |
| 6,658,554 B1 | 12/2003 | Moshovos et al. | |
| 6,658,559 B1 | 12/2003 | Arora et al. | |
| 6,678,807 B2 | 1/2004 | Boatright et al. | |
| 6,694,424 B1 * | 2/2004 | Keller et al. | 712/216 |
| 6,728,867 B1 | 4/2004 | Kling | |
| 6,918,030 B2 | 7/2005 | Johnson | |
| 7,062,617 B2 | 6/2006 | Dundas | |
| 7,181,598 B2 | 2/2007 | Jourdan et al. | |
| 7,376,817 B2 | 5/2008 | Kadambi et al. | |
| 7,415,597 B2 | 8/2008 | Filippo et al. | |
| 2002/0178349 A1 | 11/2002 | Shibayama et al. | |
| 2003/0065909 A1* | 4/2003 | Jourdan | 712/216 |
| 2003/0126409 A1 | 7/2003 | Juan et al. | |
| 2003/0217251 A1* | 11/2003 | Jourdan et al. | 712/225 |
| 2005/0268075 A1 | 12/2005 | Caprioli et al. | |
| 2006/0095734 A1 | 5/2006 | Filippo et al. | |
| 2006/0248281 A1* | 11/2006 | Al-Sukhni et al. | 711/137 |
| 2007/0226470 A1 | 9/2007 | Krimer et al. | |
| 2007/0288726 A1* | 12/2007 | Luick | 712/225 |
| 2008/0183986 A1 | 7/2008 | Yehia et al. | |
| 2009/0083263 A1 | 3/2009 | Felch et al. | |
| 2009/0187727 A1* | 7/2009 | Caprioli et al. | 711/205 |
| 2010/0205384 A1 | 8/2010 | Beaumont-Smith et al. | |
| 2010/0293347 A1 | 11/2010 | Luttrell | |
| 2010/0325395 A1* | 12/2010 | Burger et al. | 712/216 |
| 2011/0138149 A1* | 6/2011 | Karlsson et al. | 711/207 |
| 2011/0143811 A1 | 6/2011 | Rodriguez | |
| 2011/0153986 A1 | 6/2011 | Alexander et al. | |
| 2013/0298127 A1 | 11/2013 | Meier et al. | |

FOREIGN PATENT DOCUMENTS

| | | |
|---|---|---|
| EP | 0651331 A1 | 5/1995 |
| EP | 0709770 A2 | 5/1996 |
| EP | 0727737 A2 | 8/1996 |
| GB | 2281442 A | 3/1995 |
| JP | 2002351657 A | 12/2002 |
| JP | 2003519832 A | 6/2003 |
| JP | 2007293814 A | 11/2007 |
| JP | 2008512769 A | 4/2008 |
| JP | 2013515306 A | 5/2013 |
| JP | 2013239166 A | 11/2013 |
| TW | 200841238 A | 10/2008 |
| TW | 201003516 A | 1/2010 |
| TW | 201033898 A1 | 9/2010 |
| WO | 96/12227 A1 | 4/1996 |
| WO | 97/27538 A1 | 7/1997 |
| WO | 01/50252 | 7/2001 |
| WO | 2006/028555 | 3/2006 |

OTHER PUBLICATIONS

Bruce Jacob, The RiSC-16 Instruction-Set Architecture, 2000, 4 pages, [retrieved on Jan. 30, 2015], retrieved from URL <http://www.eng.umd.edu/~blj/RiSC/RiSC-isa.pdf>.*

Dynamic Scheduling, Jul. 13, 2010, 11 pages, [retrieved on Jan. 30, 2015], retrieved from URL <http://www.ece.unm.edu/~jimp/611/slides/chap4_4.html>.*

Arm Compiler toolchain using the Assembler, 2011, ARM, 4 pages, [retrieved on Jan. 30, 2015], retrieved from URL <http://infocenter.arm.com/help/index.jsp?topic=/com.arm.doc.dui0473c/CEGC-CADE.html>.*

The Magic of XOR, Dec. 4, 2005, 4 pages, [retrieved from the internet on Oct. 1, 2015], retrieved from URL <www.cs.umd.edu/class/sum2003/cmsc311/Notes/BitOp/xor.html>.*

Jaleel et al., "Using Virtual Load/Store Queues (VLSQs) to Reduce the Negative Effects of Reordered Memory Instructions", In the Proceedings of the 11th International Symposium on High-Performance Computer Architecture, Feb. 2005, 10 pages, IEEE Computer Society, Washington, DC, USA.

Leibholz, et al., "The Alpha 21264: A 500 MHz Out-of Order Execution Microprocessor", Feb. 1997, IEEE, pp. 28-36, IEEE Computer Society Press, Los Alamitos, CA, USA.

Popescu et al., "The Metaflow Architecture", IEEE Micro, Jun. 1991, pp. 10-13 and 63-73, IEEE Computer Society Press, Los Alamitos, CA, USA.

Moshovos et al., "Speculative Memory Cloaking and Bypassing", International Journal of Parallel Programming, Dec. 1999, 15 pages, Kluwer Academic Publishers, Norwell, MA, USA.

Moshovos et al., "Streamlining Inter-operation Memory Communication via Data Dependence Prediction", In Proceedings of the 30th International Symposium on Microarchitecture, Dec. 1997, 11 pages, IEEE Computer Society, Washington, DC, USA.

Gopal et al., "Speculative Versioning Cache", In Proceedings of the 4th International Symposium on High-Performance Computer Architecture, Jan. 1998, 11 pages, IEEE Computer Society, Washington, DC, USA.

Chrysos et al., "Memory Dependence Prediction Using Store Sets", Proceedings of the 25th Annual International Symposium on Computer Architecture, Apr. 16, 1998, 12 pages, IEEE Computer Society, Washington, DC, USA.

Moshovos et al., "Dynamic Speculation and Synchronization of Data Dependences", Proceedings of the 24th Annual International Symposium on Computer Architecture, Jun. 1, 1997, 13 pages, ACM, New York, NY, USA.

Johnson, Mike, "Superscalar Microprocessor Design", 1991, pp. 127-129, Prentice-Hall, Inc., Englewood Cliffs, NJ, USA.

(56) References Cited

OTHER PUBLICATIONS

Gwennap, Linley, "Digital 21264 Sets New Standard: Clock Speed, Complexity, Performance Surpass Records, But Still a Year Away", Microdesign Resources, Oct. 28, 1996, 6 pages, vol. 10, No. 14.
Reinman, et al. "Predictive Techniques for Aggressive Load Speculation", In the Proceedings of the Annual 31st International Symposium on Microarchitecture, Dec. 1998, pp. 127-137, IEEE Computer Society Press, Los Alamitos, CA, USA.
International Search Report and Written Opinion in application No. PCT/US2013/041852 mailed Sep. 30, 2013 pp. 1-14.
International Search Report and Written Opinion in application No. PCT/US2013/037809 mailed Sep. 10, 2013 pp. 1-16.
Extended Search Report in EP Application No. 13165284.4, Sep. 30, 2013, pp. 1-9.
Communication pursuant to Article 94(3) EPC in European Application No. 13165284.4, mailed Jul. 23, 2014, 6 pages.
Notice of Preliminary Rejection in Korean Patent Application No. 10-2013-49975, mailed Jul. 23, 2014, 11 pages.
Office Action in Japanese Patent Application No. 2013-096795, mailed Aug. 18, 2014, 27 pages.
Office Action in Taiwan Patent Application No. 102115961, mailed Nov. 20, 2014, 23 pages.
Non-Final Office Action in U.S. Appl. No. 13/464,647, mailed Feb. 24, 2015, 42 pages.
Kubiatowicz, John, "Reorder Buffers and Explicit Register Renaming", Sep. 22, 2000, 55 pages, [retrieved on Feb. 5, 2015], retrieved from URL <http://www.cs.berkeley.edu/~kubitron/courses/cs252-F00/lectures/lec07-renamereorder.ppt>.
Notice of Last Preliminary Rejection in Korean Patent Application No. 10-2013-49975, mailed Feb. 9, 2015, 4 pages.
Office Action in Taiwan Patent Application No. 102119009, mailed Feb. 13, 2015, 6 pages.
Final Office Action in Japanese Patent Application No. 2013-096795, mailed Mar. 4, 2015, 19 pages.
Communication pursuant to Article 94(3) EPC in European Application No. 13165284.4, mailed Jul. 20, 2015, 8 pages.
Notification of the First Office Action in Chinese Application No. 201310323392.0, mailed May 4, 2015, 33 pages.
Office Action in Taiwan Patent Application No. 102119009, mailed Dec. 2, 2015, 9 pages.
Notification of the Second Office Action in Chinese Application No. 201310323392.0, mailed Jan. 4, 2016, 14 pages.
Office Action in Japanese Patent Application No. 2015-160285, mailed Feb. 22, 2016, 21 pages.
Notification of the Third Office Action in Chinese Application No. 201310323392.0, mailed Jun. 28, 2016, 15 pages.

\* cited by examiner

| | | | LSD Predictor Table 110 | | | |
|---|---|---|---|---|---|---|
| | | | ⋮ | | | |
| Entry Number | Valid | Hashed Store Value | Store RNUM | Armed | Hashed Load Value | Counter |
| 112 | 114 | 116 | 118 | 120 | 122 | 124 |

FIG. 6

LOAD-STORE DEPENDENCY PREDICTOR PC HASHING

BACKGROUND

Field of the Invention

The present invention relates generally to processors, and in particular to methods and mechanisms for recording load and store operations in a load-store dependency predictor.

Description of the Related Art

Superscalar processors attempt to achieve high performance by issuing and executing multiple instructions per clock cycle and by employing the highest possible clock frequency consistent with the design. One way to increase the number of instructions executed per clock cycle is by performing out of order execution. In out of order execution, instructions may be executed in a different order than that specified in the program sequence (or "program order").

Some processors may be as aggressive as possible in scheduling instructions out of order and/or speculatively in an attempt to maximize the performance gain realized. For example, it may be desirable to schedule load memory operations prior to older store memory operations, since load memory operations more typically have dependent instructions. However, in some cases, a load memory operation may depend on an older store memory operation (e.g., the store memory operation updates at least one byte accessed by the load memory operation). In such cases, the load memory operation is incorrectly executed if executed prior to the store memory operation. If a load memory operation is executed prior to an older store memory operation on which the load depends, the processor may need to be flushed and redirected, which will degrade processor performance.

An operation is older than another operation if the operation is prior to the other operation in program order. An operation is younger than another operation if it is subsequent to the other operation in program order. Similarly, operations may be indicated as being prior to or subsequent to other operations, or may be referred to as previous operations, preceding operations, subsequent operations, etc. Such references may refer to the program order of the operations. Furthermore, a "load memory operation" or "load operation" may refer to a transfer of data from memory or cache to a processor, and a "store memory operation" or "store operation" may refer to a transfer of data from a processor to memory or cache. "Load operations" and "store operations" may be more succinctly referred to herein as "loads" and "stores", respectively.

A table may be used to store load-store pairs that have caused previous ordering violations. Mechanisms to identify loads and stores in these tables often rely on the respective program counter (PC) value. Searching for a full PC value in a fully associative structure may be costly in terms of the power used, and so alternatively, a portion of the PC may be used to identify loads and stores. However, if only a portion of a PC is utilized, some amount of aliasing between unique PCs may occur. Furthermore, some load instructions are decoded into a sequence of multiple load operations and some store instructions are decoded into a sequence of multiple store operations. For these instructions, when an ordering violation occurs, it is difficult to differentiate between the multiple load and store operations to determine which specific load operation was dependent on which specific store operation.

SUMMARY

Processors and methods for predicting and managing load-store dependencies are contemplated. A processor may include a load-store dependency predictor, and the load-store dependency predictor may be configured to store entries for load-store pairs that are predicted to cause ordering violations. When an ordering violation between a younger load and an older store on which the younger load depends is detected, this constitutes a training event for the load-store dependency predictor. After the load-store pair has been trained, the predictor may add a dependency to the load the next time the load comes through the dispatch unit. This added dependency indicates the load should not be issued out of a reservation station until the store has been issued.

In one embodiment, a predictor table may be utilized to store load-store pairs that have been found to be dependent. When a younger load issues in front of an older store that shares an address dependency, an entry may be allocated in the predictor table, and in one embodiment, the entry may include a hashed store value and a hashed load value to identify the store and load, respectively. In one embodiment, the hashed values may be derived from a portion of the program counter (PC) and an architectural register number. For the store, a source architectural register number may be hashed with the PC. For the load, a destination architectural register number may be hashed with the PC. When a store or load operation is dispatched, the hashed value may be created, and then the table may be searched for any matching entries.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 illustrates one embodiment of a load-store dependency predictor table.

DETAILED DESCRIPTION OF EMBODIMENTS

Figure 1:
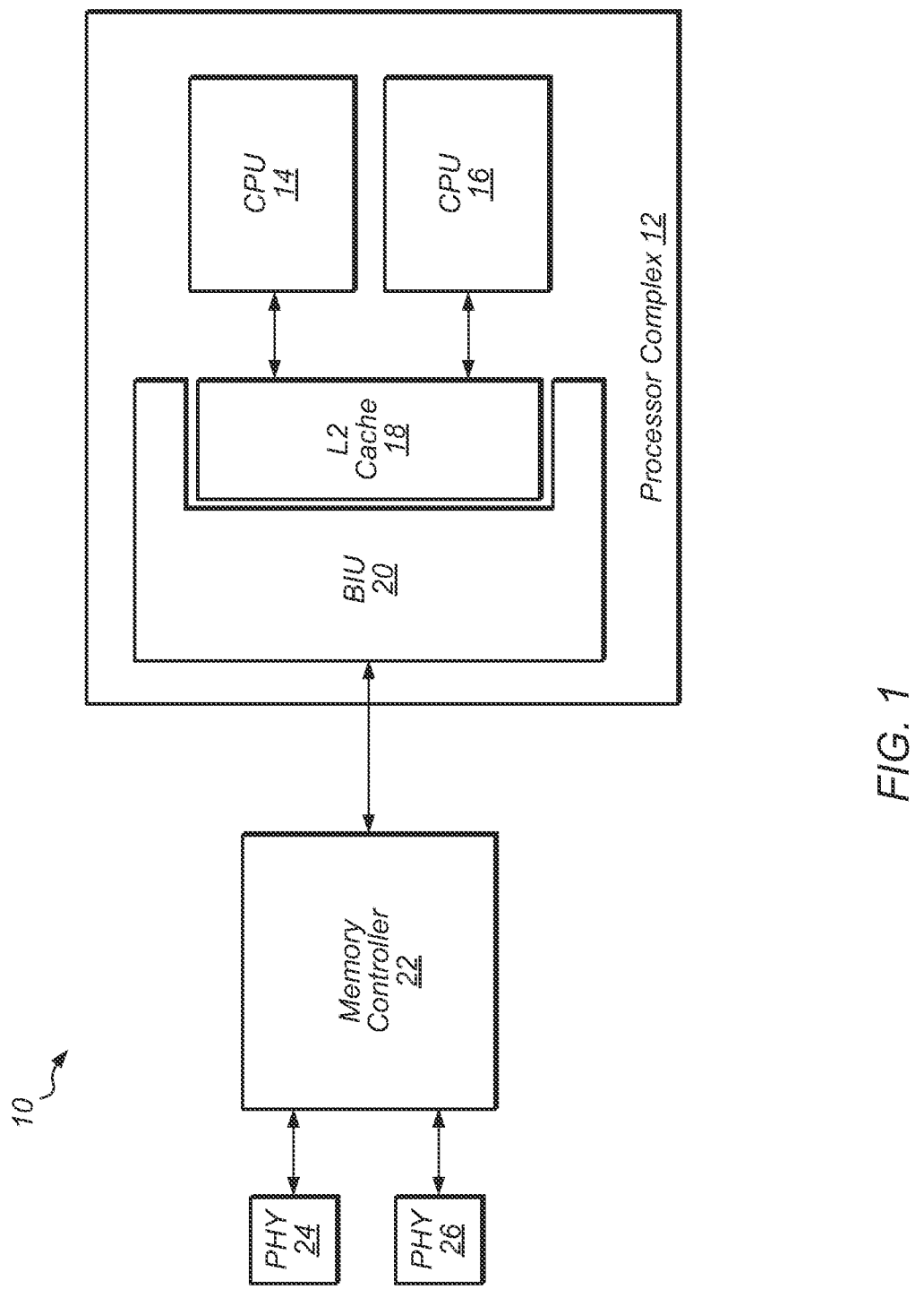
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a load-store dependency predictor . . . ." Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. CPUs 14 and 16 may be coupled to L2 cache 18. L2 cache 18 may be coupled to BIU 20, which may be coupled to memory controller 22. Other embodiments may include additional levels of cache (e.g., level three (L3) cache). It is noted that processor complex 12 may include other components not shown in FIG. 1.

The CPUs 14 and 16 may include circuitry to execute instructions defined in an instruction set architecture. Specifically, one or more programs comprising the instructions may be executed by the CPUs 14 and 16. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In one embodiment, each instruction executed by CPUs 14 and 16 may be associated with a PC value. Also, one or more architectural registers may be specified within some instructions for reads and writes. These architectural registers may be mapped to actual physical registers by a register rename unit. Furthermore, some instructions may be broken up into (or otherwise correspond to) a sequence of operations (or micro-ops or "uops"), and each operation of the sequence may be referred to by a micro-op number. For example, in a case where a particular instruction corresponds to 5 micro-ops, the first micro-op may be identified as micro-op "0", the second as "1", the third as "2", and so on. Numerous approaches for identifying micro-ops in a sequence are possible and are contemplated. Each operation of the sequence, while sharing a common PC, may also have a unique architectural register number that differentiates it from other operations of the sequence.

The term "architectural register" may refer to an architecturally visible register that a software programmer and/or a compiler may identify within the software application. In addition, the term "architectural register" may also be referred to as a "micro-architectural register" in some embodiments. Architectural registers may be associated with a given ISA. The hardware circuitry in CPUs 14 and 16 may include physical registers, and the architectural registers may be mapped to the physical registers.

In various embodiments, CPUs 14 and 16 may execute instructions out-of-order, which in some cases may cause ordering violations. For example, in the case of load and store instructions, ordering violations may occur when younger loads execute before older stores with overlapping physical addresses. To avoid or to prevent a repetition of this type of ordering violation, various techniques may be employed to prevent a younger load from being executed prior to an older store upon which it is dependent. In one embodiment, each of CPUs 14 and 16 may include a load-store dependency predictor for keeping track of load-store pairs which are predicted to be dependent and which may also have a tendency to execute out of order. In one embodiment, dependent load-store pairs may be recorded in a table utilizing hashed values to identify the load and store.

In one embodiment, each hashed value may be created from the PC and one of the architectural register numbers. In another embodiment, each hashed value may be created from the PC and a corresponding micro-op (or uop) number. For a load-store pair recorded in an entry of the load store dependency predictor table, a load may be recorded and identified by its hashed value and the store may be recorded and identified by its hashed value. When a store is dispatched, the hashed store value may be generated and used to search the table for any matching entries. Similarly, when a load is dispatched, the hashed load value may be generated and used to search the table for any matching entries.

Each of CPUs 14 and 16 may also include a level one (L1) cache (not shown), and each L1 cache may be coupled to L2 cache 18. In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. The memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
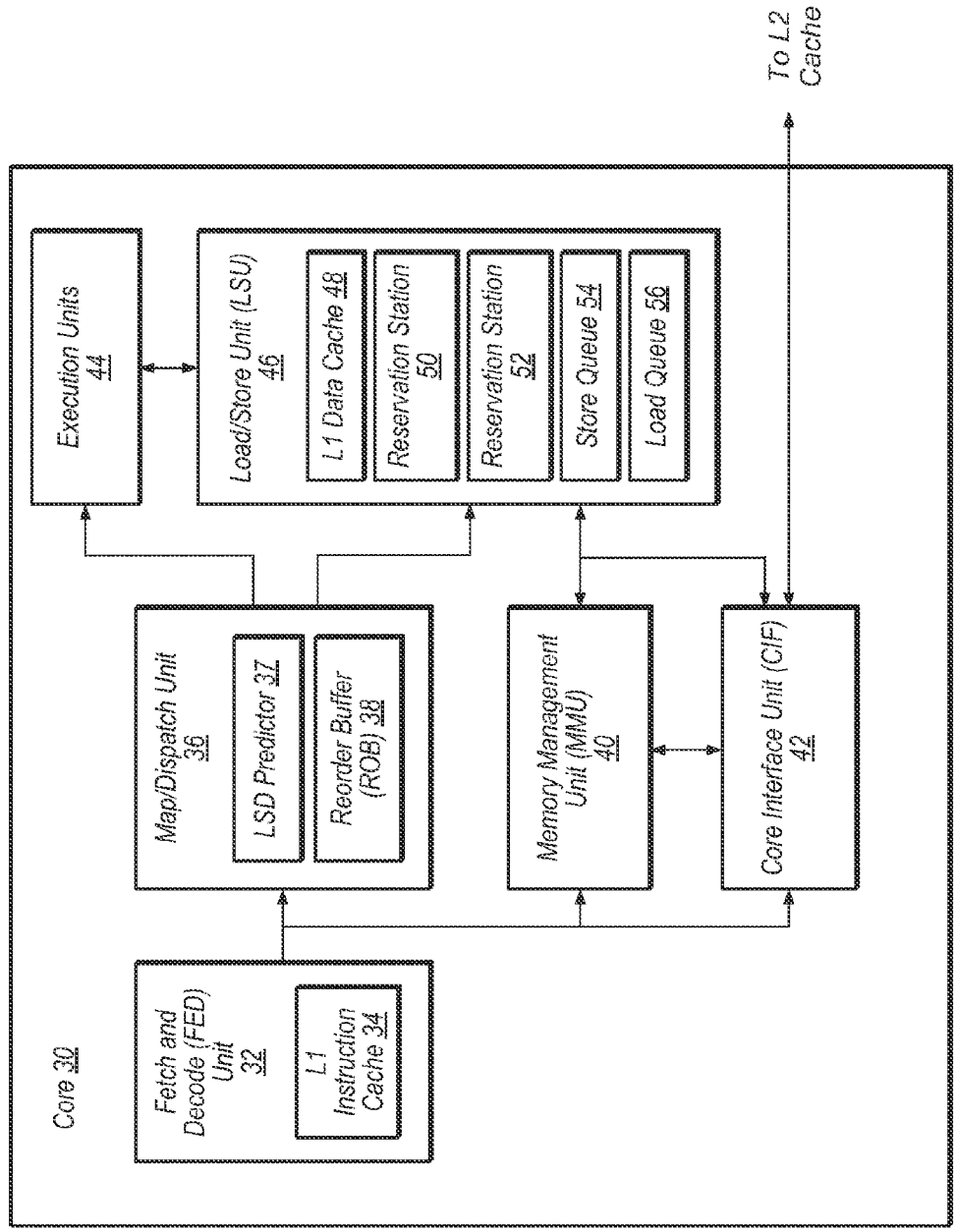
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 40, core interface unit (CIF) 42, execution units 44, and load-store unit (LSU) 46. It is noted that core 30 may include other components and interfaces not shown in FIG. 2.

FED unit 32 may include circuitry configured to read instructions from memory and place them in level one (L1) instruction cache 34. L1 instruction cache 34 may be a cache memory for storing instructions to be executed by core 30. L1 instruction cache 34 may have any capacity and construction (e.g. direct mapped, set associative, fully associative, etc.). Furthermore, L1 instruction cache 34 may have any cache line size. FED unit 32 may also include branch prediction hardware configured to predict branch instructions and to fetch down the predicted path. FED unit 32 may also be redirected (e.g. via misprediction, exception, interrupt, flush, etc.).

FED unit 32 may also be configured to decode the instructions into instruction operations (or u-ops). Generally, an instruction operation may be an operation that the hardware included in execution units 44 and LSU 46 is capable of executing. Each instruction may translate to one or more instruction operations which, when executed, result in the performance of the operations defined for that instruction according to the instruction set architecture. FED unit 32 may be configured to decode multiple instructions in parallel.

In various ISA's, some instructions may decode into a single instruction operation (or op). FED unit 32 may be configured to identify the type of instruction, source operands, etc., and each decoded instruction operation may comprise the instruction along with some of the decode information. In other embodiments in which each instruction translates to a single op, each op may simply be the corresponding instruction or a portion thereof (e.g., the opcode field or fields of the instruction). In some embodiments, the FED unit 32 may include any combination of circuitry and/or microcode for generating ops for instructions. For example, relatively simple op generations (e.g., one or two ops per instruction) may be handled in hardware while more extensive op generations (e.g., more than three ops for an instruction) may be handled in microcode. In other embodiments, the functionality included within FED unit 32 may be split into two or more separate units, such as a fetch unit, a decode unit, and/or other units.

Decoded ops may be provided to map/dispatch unit 36. Map/dispatch unit 36 may be configured to map ops and architectural registers to physical registers of core 30. Map/dispatch unit 36 may implement register renaming to map source register addresses from the ops to the source operand numbers identifying the renamed source registers. Map/dispatch unit 36 may also be configured to dispatch ops to reservation stations within execution units 44 and LSU 46. Map/dispatch unit 36 may include load-store dependency (LSD) predictor 37 and reorder buffer (ROB) 38. Prior to being dispatched, the ops may be written to ROB 38. ROB 38 may be configured to hold ops until they can be committed in order. Each op may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

LSD predictor 37 may be configured to train on and predict dependent load-store instruction pairs that are likely to issue out-of-order. LSD predictor 37 may include a table with entries for the load-store pairs that have been trained, and each entry may include information identifying the load and store operations and the strength of the prediction. In one embodiment, a training event may be an ordering violation triggered by the execution of a younger load before an older store with overlapping physical addresses. In one embodiment, the table may be a 256-entry fully associative structure. In other embodiments, the table may have other numbers of entries. In various embodiments, the table may be a content-addressable memory (CAM) for various fields of the table.

When there is an order violation between dependent load and store operations, core 30 may be redirected and resynced. Various corrective actions may be taken as a result of a redirect. At this point, training may be performed for the particular load-store pair that caused the resync. An entry for this particular pair may be allocated in LSD predictor 37, hashed identifiers for both the load and the store may be recorded in the entry, and the strength of the prediction may be set to a high level. Each entry in the LSD predictor 37 may include hashed values derived from a PC and an architectural register number of the given load and store operations. After the training, on a next pass through the pipeline of core 30, when the store from the trained load-store pair is dispatched from unit 36, LSD predictor 37 may be searched for the store's hashed identifier. The matching entry may be found and armed. When the load from the trained load-store pair is dispatched from unit 36, a search of LSD predictor 37 may be performed for the load's hashed identifier, and the load's hashed identifier will match on the armed entry. Then, the load may be dispatched to a reservation station with a dependency, causing the load to wait on the store before issuing from the reservation station.

Execution units 44 may include any number and type of execution units (e.g., integer, floating point, vector). Each of execution units 44 may also include one or more reservation stations (not shown). CIF 42 may be coupled to LSU 46, FED unit 32, MMU 40, and an L2 cache (not shown). CIF 42 may be configured to manage the interface between core 30 and the L2 cache. MMU 40 may be configured to perform address translation and memory management functions.

LSU 46 may include L1 data cache 48, reservation stations 50 and 52, store queue 54, and load queue 56. Load and store operations may be dispatched from map/dispatch unit 36 to reservation stations 50 and 52. Other embodiments may include other numbers of reservation stations. Operations may issue out of reservation stations 50 and 52 out-of-order. Store queue 54 may store data corresponding to store operations, and load queue 56 may store data associated with load operations. LSU 46 may also be coupled to the L2 cache via CIF 42. It is noted that LSU 46 may also include other components (e.g., register file, prefetch unit, translation lookaside buffer) not shown in FIG. 2.

A load-store order violation may be detected by LSU 46 at the time the older store is issued. In one embodiment, the store address of the older store may be compared against all younger loads in load queue 56. If a match is detected, then the load operation may have already completed with the incorrect data. This may be corrected in the future by signaling a redirect back to map/dispatch unit 36 using the RNUMs of the load and store operations. Map/dispatch unit 36 may flush the instructions from core 30 pipeline and redirect the front-end of core 30 back to the instruction address of the load, and the load instruction may be refetched. To prevent future redirects, map/dispatch unit 36 may predict and record dependencies for loads on stores in LSD predictor 37 and communicate the predicted dependencies to reservation stations 50 and 52.

In a typical case, when a store is dispatched, LSD predictor 37 may be searched for the hashed store value, and then if a match is found for the store, then the matching entry in table may be armed (i.e., activated), and then the store RNUM may be written to the entry. A little while later the load may be dispatched, and the load may search across the hashed load values in the table.

The load may match on any number of entries in LSD predictor 37. In one embodiment, for a real match to occur, the entry needs to be armed. If the load matches on one armed entry, then a dependency to the store RNUM may be created by linking the armed store RNUM to the load. The load may be marked as waiting for that particular store RNUM to issue from a reservation station. In the reservation stations, there may be a dependency field for loads, and the load may be marked as dependent on a given store to issue from one of the reservation stations 50 or 52. So in this case, the load may be marked as waiting for a specific store RNUM, and the load may issue one cycle after the specific store issues.

If the load matches on multiple armed store entries, this may be referred to as a multimatch case. In this case, the load may wait until all older stores have issued before issuing. For example, in one embodiment, a bit may be set so that the load may wait for all older stores to issue before the load issues. This will force all older stores to issue from reservation stations 50 and 52 ahead of the load. In one embodiment, each of reservation stations 50 and 52 may make available the oldest store it contains. Once the load becomes older than both of those stores, then the load may issue.

When a load matches on an entry in LSD predictor 37 and the entry is armed, this signifies there is a valid store which the load needs to wait on. The entry may also include an indicator as to the strength of the prediction. In one embodiment, the indicator may be a counter, and if the value of the counter is above a threshold, then the entry may be considered a strong, highly likely prediction and the load-store dependency may be established. The value of the threshold may vary from embodiment to embodiment. If the load matches on an armed entry, and the indicator is weak, indicating not to use the prediction, then a dependency may not be established for the load. If the load-store dependency is established, then the load may pick up the RNUM of the store, such that the RNUM gets read out of the entry and passed along to the reservation station with the load when the load is dispatched. The load may also be marked as having a dependency in the reservation station.

After a load with an established dependency issues, the load store unit can determine whether the load data was sourced from the data cache or the store queue (or elsewhere). Depending on where the load receives its data, the prediction strength indicator in the corresponding entry of LSD predictor 37 may be increased, decreased, or left the same. For example, if the load data was forwarded from store queue 54, then the prediction from LSD predictor 37 may be considered good. In this case, the data from the store had not yet made it to cache 48, and so it was beneficial that the load waited for the store. If the load data for this load operation is still in store queue 54, then this may indicate that there really is a true dependency between the load and the store. In other words, the data did need to be forwarded from store queue 54 for the dependent load.

If there is a miss in store queue 54 for the load data, then the dependency may no longer be valid. It is possible that there was a prior dependency, but then the address of the load or the store changed, and the load and store no longer collide. In this case, if the store data is retrieved from cache 48, then the data may have been stored there for a long time. Therefore, determining whether the store data was forwarded from store queue 54 or from cache 48 may indicate whether the prediction was accurate or not. Furthermore, the prediction strength indicator stored in the matching entry of LSD predictor 37 may be updated based on this determination. If the prediction was accurate, such that the load data is forwarded from store queue 54, then the prediction strength indicator may be increased. If the load data comes from cache 48, then the prediction strength indicator may be decreased. In other embodiments, other techniques for determining if the dependency prediction was accurate may be utilized.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
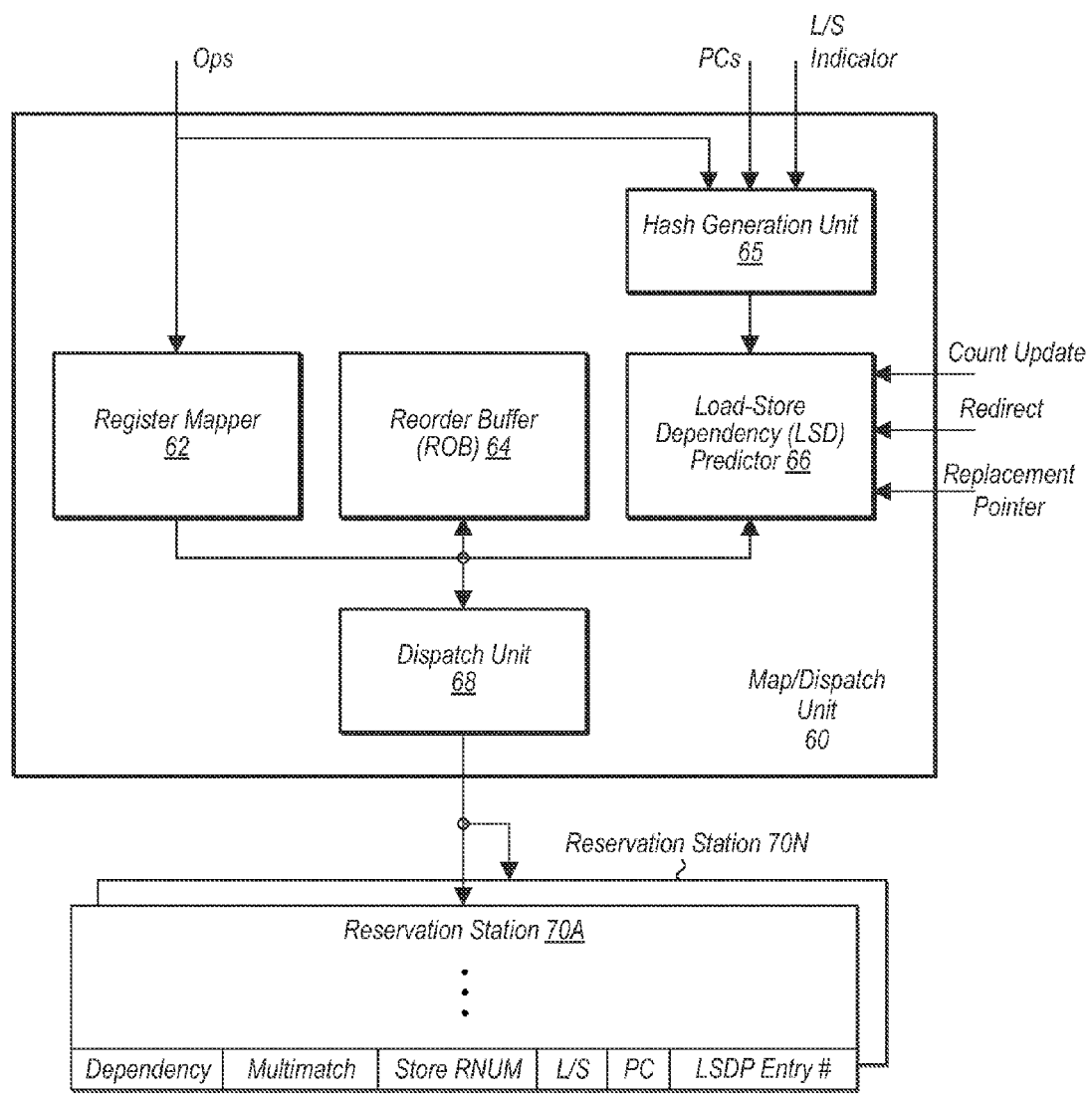
FIG. 3 is a block diagram illustrating one embodiment of a map/dispatch unit and a reservation station.

Referring now to FIG. 3, a block diagram of one embodiment of a map/dispatch unit and a reservation station is shown. In one embodiment, map/dispatch unit 60 may include a register mapper 62, a reorder buffer (ROB) 64, a hash generation unit 65, a load store dependency (LSD) predictor 66, and a dispatch unit 68. The register mapper 62 and hash generation unit 65 are coupled to receive ops from a decode unit (not shown), and hash generation unit 65 is coupled to receive PCs from the decode unit. Hash generation unit 65 may also be coupled to receive a load/store (L/S) indicator to determine when hashed identifiers should be generated. LSD predictor 66 is coupled to receive the "Redirect" and "Count Update" signals from a load-store unit (not shown). LSD predictor 66 is also coupled to a replacement pointer which searches LSD predictor 66 for entries that can be discarded when a new entry is allocated.

Register mapper 62 may be configured to map architectural registers to physical registers, and to provide ops and physical register addresses to dispatch unit 68. Dispatch unit 68 may be configured to dispatch ops to reservation stations 70A-N. Dispatch unit 68 may be configured to maintain a free list of reservation station entries in reservation stations 70A-N, and dispatch unit 68 may generally assign the entries to ops to balance the load between reservation stations 70A-N. For example, dispatch unit 68 may be configured to dispatch an op to the reservation station with the most available entries.

LSD predictor 66 may be configured to compare the hashed tags of any detected stores and loads to the hashed tags of previously encountered stores and loads that previously caused ordering violations and have been allocated entries in the training table. If a hashed tag matches for a given store, LSD predictor 66 may be configured to arm the corresponding entry in the training table. In one embodiment, LSD predictor 66 may check the strength of prediction indicator before arming the entry. If the indicator is above a threshold then the entry may be armed, and otherwise, if the indicator is below the threshold, then the entry may not be armed. Additionally, LSD predictor 66 may be configured to capture the RNUM assigned to the store as an identifier of the store.

When a load is detected that matches to the armed entry and the strength of prediction indicator for the armed entry is above the threshold, LSD predictor 66 may be configured to use the store identifier to generate a dependency for the load on the store, preventing the load from being issued by reservation station 70 until after the store is issued. In one embodiment, LSD predictor 66 may be configured to forward the store RNUM to a given reservation station 70 along with an indicator that the load has a dependency. Additionally, if there are multiple matches for the load, then LSD predictor 66 may forward a multimatch indicator to the given reservation station 70. In other embodiments, LSD predictor 66 may be configured to forward multiple store RNUMs in the multimatch case to reservation station 70, and reservation station 70 may be configured to store more than one store RNUM per load. Other embodiments may indicate the load-store dependencies in other fashions.

Reservation stations 70A-N are representative of any number of reservation stations which may be utilized as part of a load/store unit (not shown) and/or execution units (not shown). Each reservation station 70A-N may be configured to store operations until the operations are executed by a corresponding functional unit. An example of an entry within reservation station 70A in accordance with one embodiment is shown in FIG. 3. Each of reservation stations 70A-N may include various numbers of entries, depending on the embodiment. Each entry may include a dependency indicator, a multimatch indicator, a store RNUM of a dependency, a load/store (L/S) indicator to indicate if the operation is a load or store, a PC of an operation, and a LSD predictor (LSDP) entry number. In other embodiments, the entry may include other fields (e.g., source register, destination register, source operands) and/or omit one or more of the fields shown in FIG. 3. Furthermore, other types of entries (e.g., integer, floating point) may be formatted differently.

LSD predictor 66 may be configured to identify load-store pairs that cause ordering violations based on the redirect indication. The redirect indication may include the load and the store PCs, hashed load and store values, or other load and store identifiers. LSD predictor 66 may thus be trained by stores and loads which cause ordering violations, to prevent such events in the future when the same code sequence is refetched and reexecuted in the processor.

Hash generation unit 65 may be configured to generate hashed load and store values from the load and store PCs, architectural register numbers, and/or micro-op numbers. When a load or store is received and detected by map/dispatch unit 60, hash generation unit 65 may generate the hashed value in any suitable manner. The hashed values may be used to search LSD predictor 66. If the load or store is received as part of a redirect training event, then the generated hashed value may be stored in a newly allocated entry of LSD predictor 66. While hash generation unit 65 is shown as being located within map/dispatch unit 60 in FIG. 3, it is noted that hash generation unit 65 may be located elsewhere within a processor core in other embodiments.

In one embodiment, unit 65 may include a buffer for temporarily storing hashed values. If a load-store pair causes an ordering violation and the load-store pair is not yet stored in predictor 66, then a new entry may be allocated in predictor 66 for the load-store pair. The stored hashed values, which were generated to search predictor 66 when the original load and store operations were dispatched, may be written to the new entry. Alternatively, the hashed values may be discarded after the search of predictor 66 is performed, and after an ordering violation, the hashed values may be regenerated when the original instructions are refetched and reexecuted. In this scenario, the hashed values may be written to the newly allocated entry in predictor 66 after the hashed values are regenerated.

Register mapper 62 may include a memory with an entry for each logical register. The entry for each logical register in the register mapper 62 may store the RNUM of the most recent op to update the logical register. Additional status may be stored in the rename map entries as well. For example, a bit may indicate whether or not the most recent op has been executed. In such an embodiment, register mapper 62 may receive signals from a given reservation station 70 identifying the ops that have been issued, which may allow register mapper 62 to update the bit. A bit indicating whether or not the most recent op has been retired may also be included.

It is noted that not all of the connections to the units shown in FIG. 3 are illustrated, and the map/dispatch unit 60 may include additional circuitry implementing other operations, not shown. For example, register mapper 62 and ROB 64 may receive the redirect indications to adjust their mappings to account for the ops being flushed. Additionally, register mapper 62 and ROB 64 may receive an indication of retiring ops to adjust their state to the retirement (e.g., freeing entries for assignment to new ops, updating the architected rename state, etc.). These operations are ancillary to the operation of LSD predictor 66, and thus are not described in more detail herein.

Figure 4:
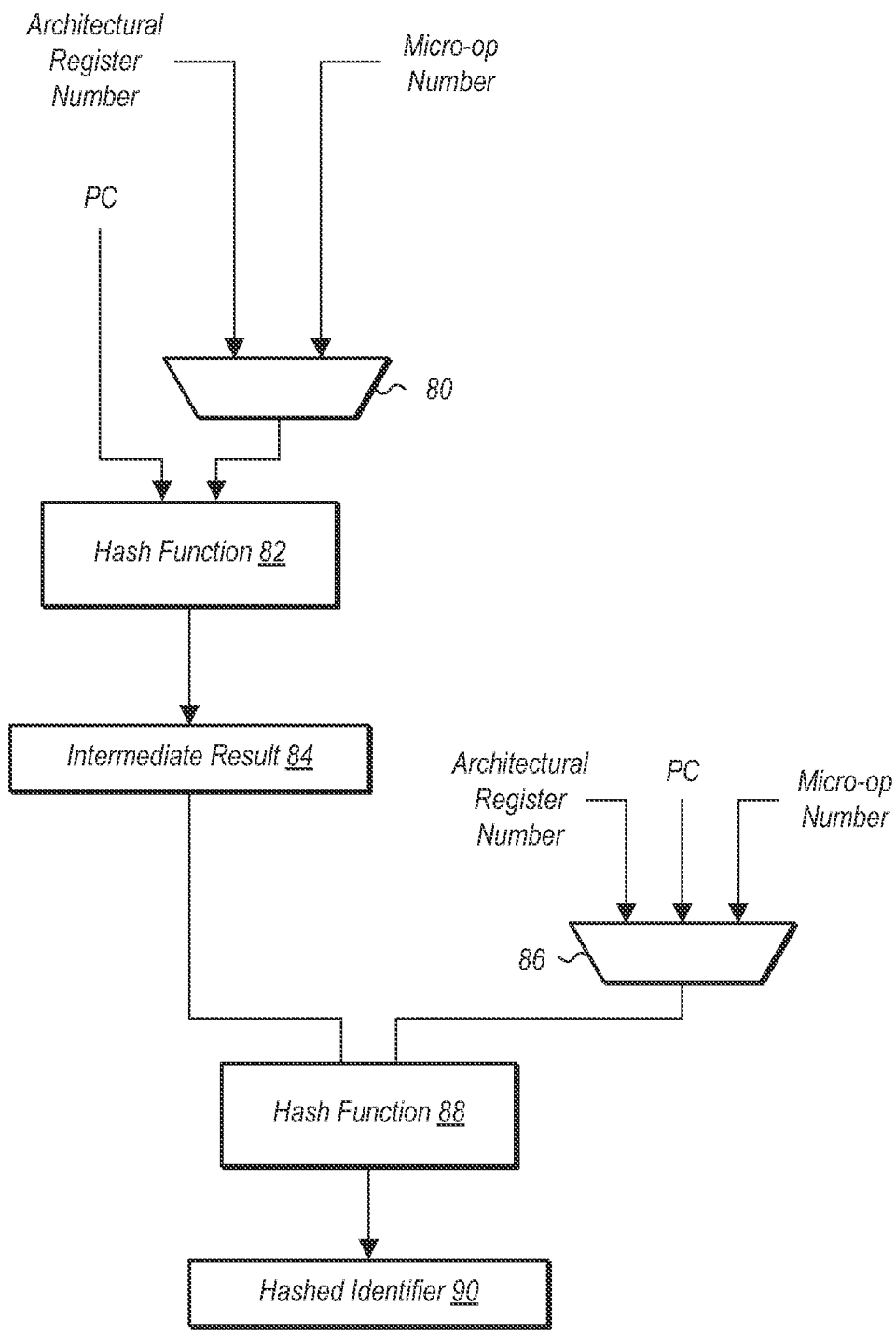
FIG. 4 illustrates a block diagram of one embodiment of a hash generation unit.

Turning now to FIG. 4, one embodiment of a hash generation unit is shown. The inputs to hash generation unit for a given operation may be the PC, architectural register number(s), and micro-op number of the given operation. The PC may be coupled to hash function 82, and the architectural register number and micro-op number may be coupled to multiplexer (mux) 80. Mux 80 may or may not be included within a hash generation unit, depending on the embodiment. Mux 80 is shown to illustrate that the architectural register number or micro-op number may be coupled to hash function 82. In some embodiments, mux 80 may be utilized to switch between using the architectural register number and micro-op number based on various operating conditions. In other embodiments, the architectural register number or micro-op number may be coupled to hash function 82 without mux 80, and this may be a hard-wired connection.

Hash function 82 may generate a hashed value (intermediate result 84) from the inputs of the PC and the architectural register number or micro-op number. The values generated by hash function 82 may also be referred to as hash codes, hash sums, checksums, or hashes. Hash function 82 may utilize a portion or the entirety of the input values to generate a hashed value, depending on the embodiment. Hash function 82 may utilize any type of hashing function to generate intermediate result 84. For example, in various embodiments, hash function 82 may utilize an XOR function, message digest (MD-5) hash, secure hash algorithm (SHA-1) hash, or any other type of hash function.

In one embodiment, intermediate result 84 may be hashed against the output of mux 86 by hash function 88. In another embodiment, intermediate result 84 may be the final result and the actual hashed identifier, and the second stage of hashing may be omitted. Mux 86 may or may not be an actual multiplexer within the hash generation unit, depending on the embodiment. Rather, mux 86 is used to illustrate that any portion of the architectural register number, PC, and micro-op number may be combined in any fashion and coupled to the input of hash function 88 to be hashed with intermediate result 84. For example, in one embodiment, only the architectural register number may be coupled to the input of hash function 88. In other embodiments, mux 86 may be utilized and the input that is coupled to hash function 88 may be configurable via the select signal (not shown) to mux 86. Hash function 88 may utilize any type of hashing previously described. Hashed identifier 90 may be generated by hash function 88, and hashed identifier 90 may be utilized by a load-store dependency predictor to identify the respective operation.

It is noted that in other embodiments, the hash generation unit of FIG. 4 may include other stages beyond hash function 88. For example, additional hash functions may apply further hashing functions to the value generated by hash function 88. In these embodiments, the output generated by hash function 88 may be an intermediate value that is hashed by one or more additional stages of hash functions. The actual configuration of the hash generation unit in FIG. 4 that is implemented may be chosen to achieve a high amount of randomness for the distribution of hashed values. In other words, the hash generation unit may be constructed to disambiguate between different operations in order to prevent aliasing.

Figure 5:
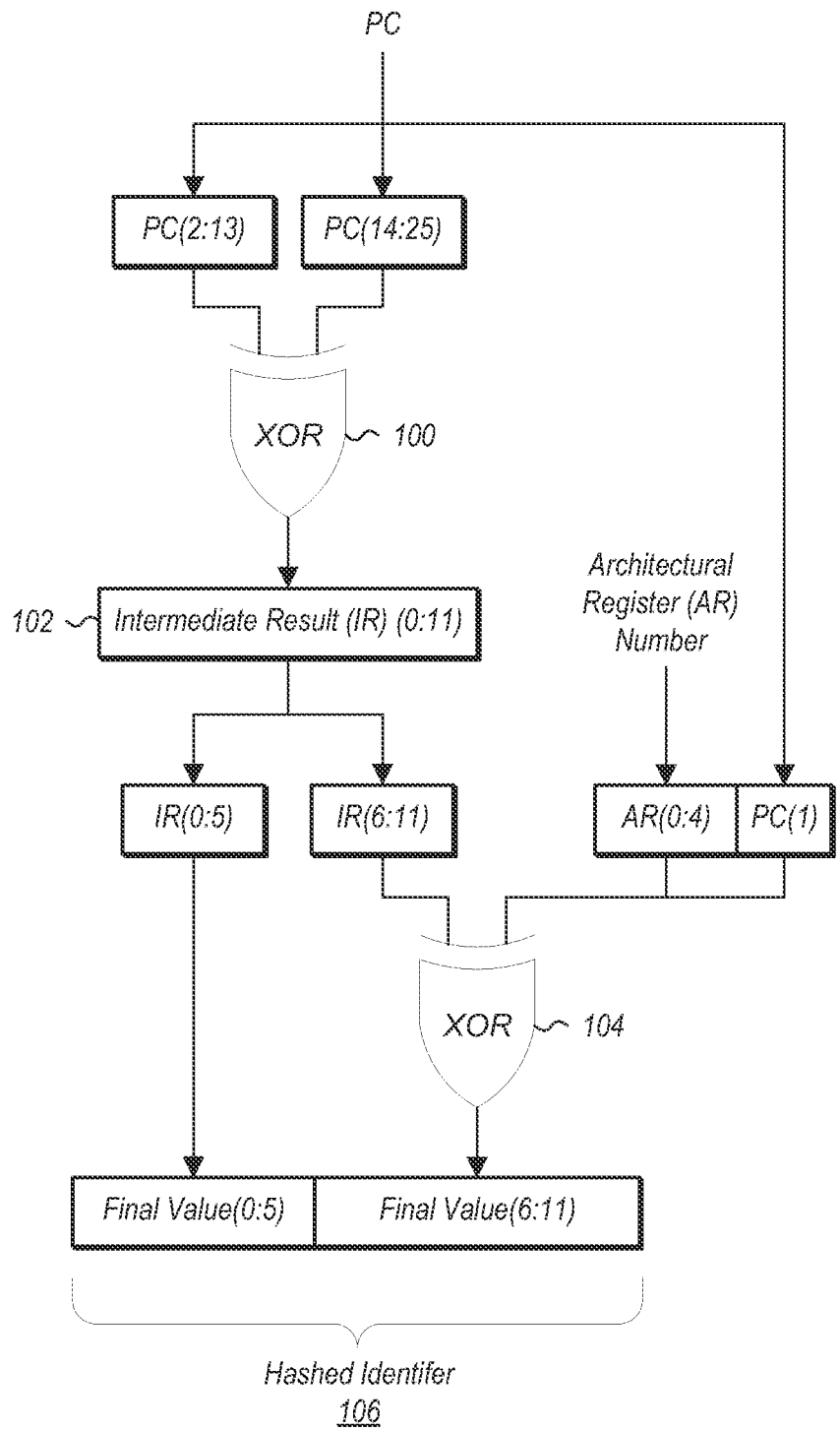
FIG. 5 illustrates a block diagram of another embodiment of a hash generation unit.

Referring now to FIG. 5, another embodiment of a hash generation unit is shown. FIG. 5 provides a more detailed schematic of a hash generation unit than the generalized block diagram approach illustrated in FIG. 4. It is noted that FIG. 5 illustrates one embodiment of a hash generation unit, and other embodiments may be configured in any of various other manners.

In a first stage of hashing, non-overlapping portions of the PC value may be coupled to the inputs of multi-bit XOR 100. As shown, bits 2:13 of the PC value may be coupled to one input of XOR 100 and bits 14:25 of the PC value may be coupled to the other input of XOR 100. It is noted that other embodiments may utilize other portions of the PC value and other numbers of bits. XOR 100 may perform a multi-bit XOR operation on the inputs, such that bit 2 of the PC value is XORed with bit 14 of the PC value, bit 3 is XORed with bit 15, and so on. The output from XOR 100 may be referred to as intermediate result (IR) 102, which is a 12-bit value. The size of IR 102 may be more or less than 12 bits in other embodiments.

The upper portion of IR 102, bits 6:11, may be coupled to an input of XOR 104. The architectural register (AR) number, bits 0:4, and bit 1 of the PC value may be concatenated and coupled to the other input of XOR gate 104. In other embodiments, the AR number may have more or fewer bits than five, and a portion or the entirety of the AR number may be utilized to generate a hashed identifier. For ARM Thumb 16-bit instructions, bit 1 of the PC value may be utilized in the hashing process to distinguish between different instructions to prevent aliasing. Bit 6 of IR 102 may be XORed with bit 0 of the AR number, bit 7 of IR 102 may be XORed with bit 1 of AR, and so on, and bit 11 of IR 102 may be XORed with bit 1 of the PC value.

The output of XOR 104 may form the upper bits (6:11) of the final value, while the lower bits of IR 102 may form the lower bits (0:5) of the final value. The final value may be the hashed identifier 106 which is utilized to identify load and store operations in a load-store dependency predictor. It is noted that the hashing of bits, the number of bits, which portions of PC and architectural register number that are hashed are specific to one embodiment, and other embodiments may vary the selection of bits that are hashed, the number of hashing stages, the size of the final hashed value, and other elements of the hash generation unit shown in FIG. 5.

Turning now to FIG. 6, one embodiment of a load-store dependency predictor table is shown. Table 110 may include various numbers of entries, depending on the embodiment. Each entry may correspond to a load-store pair that has been predicted to have overlapping addresses and issue out of order. An entry may be allocated in table 110 in response to an ordering violation being detected. In the event that an ordering violation has occurred, a store queue entry may flush the processor, including the load that caused the violation, back to the fetch unit and table 110 may be trained on this violation. When the flushed load replays, it should hit in table 110 and wait in a reservation station for the store to issue.

Table 110 may be configured to allow multiple simultaneous accesses and updates by multiple ops. Furthermore, while table 110 is illustrated as an integrated table, the different fields may be separate tables corresponding to separate memories, with entries of the separate tables associated with each other. For example, the hashed load values 122 may be a separate table, the hashed store values 116 may be a separate table, and a hashed load value 122 may have the same entry number 112 as a corresponding hashed store value 116 for which a specific load-store ordering violation has been detected and trained.

Each entry may include an entry number 112 by which the entry may be identified. In one embodiment, for a load with a dependency, the load may be dispatched to a reservation station with its respective entry number 112. Each entry may also include a valid indicator 114. Valid indicator 114 may indicate if the entry is a valid entry and if the entry should be used for enforcing a dependency between the load and store indicated by the entry. In one embodiment, the valid indicator 114 may be cleared at reset. Valid indicator 114 may also affect the replacement policy, such that invalid entries may be the first entries that are replaced when new entries are allocated. In some embodiments, valid indicator 114 may not be included in the entries of table 110. Instead, in these embodiments, the value of counter field 124 may be used to indicate if the entry is valid. Other embodiments may exclude counter field 124 in the table and only use the valid indicator 114.

Each entry may also include a hashed store value 116 to identify the specific store operation. When a store is dispatched, the hashed store values 116 of table 110 may be searched for the specific hashed store value of the dispatched store. Table 110 may be a CAM for the hashed store value field, where each entry in the memory includes circuitry to make the comparison. The hashed store value field may also be a set of registers and comparators that are operated as a CAM. If a dispatched store matches on any entries, then these entries may have the armed bit 120 set. The RNUM of the store may also be written to the store RNUM 118 field of the entry. When a store is issued from a reservation station, then the armed bit 120 may be cleared from any entries of table 110 that were previously armed by that particular store.

When a load is dispatched, the hashed load value 122 of each entry of table 110 may be searched for the specific hashed load value of the dispatched load. Table 110 may be a CAM for the hashed load value field. If a dispatched load matches on any armed entries, then a dependency may be established and enforced for the specific load. If the load matches on an unarmed entry, then a dependency is not established because the corresponding store has either not been dispatched or has already been issued, and therefore an ordering violation should not occur. If the load matches on multiple armed entries, then the load may wait until all older stores have been issued before the load itself issues. If the load matches on a single armed entry, then the store RNUM may be written to the reservation station with the load. There may also be a dependency bit set for the load in the reservation station to indicate that the load has a valid dependency.

Each entry may also include a counter field 124. The value of counter 124 may indicate the strength of the prediction for that particular load-store pair in the entry. In one embodiment, counter 124 may be a two-bit up-down counter. In other embodiment, counter 124 may utilize other numbers of bits. Furthermore, counter 124 may be configured to saturate at its maximum and minimum values.

When a store matches on an entry, the counter value 124 may be checked before arming the entry. If the counter value 124 is below a threshold, then the entry may not be armed. If the counter value 124 is above the threshold, then the entry may be armed. In some embodiments, the entry may be armed without checking the counter value 124. When a load matches on an entry, the counter value 124 may also be checked. Only if the counter value 124 is above the threshold may the dependency be enforced. The value of the threshold may vary depending on the embodiment, and may be adjusted according to specific operating conditions.

In another embodiment, age-out counters may be utilized with the entries of table 110. Each entry may include an age-out counter, and the age-out counter may be set to some initial value when the entry is first allocated. An interval counter may also be utilized to count for a programmable interval, and when the interval counter expires, each age-out counter in table 110 may be decremented. The interval counter may then start over and count for the programmable interval. Each time the interval elapses, each age-out counter in table 110 may be decremented. Any time an entry is accessed or armed by a load-store pair, the age-out counter may be incremented by a fixed amount. If an entry in table 110 is no longer being used, then eventually its age-out counter will get to zero, at which point the entry may be replaced with a new entry. In other embodiments, table 110 may include additional fields and/or omit one or more fields shown in FIG. 6. Furthermore, table 110 may be formatted differently in other embodiments.

Figure 7:
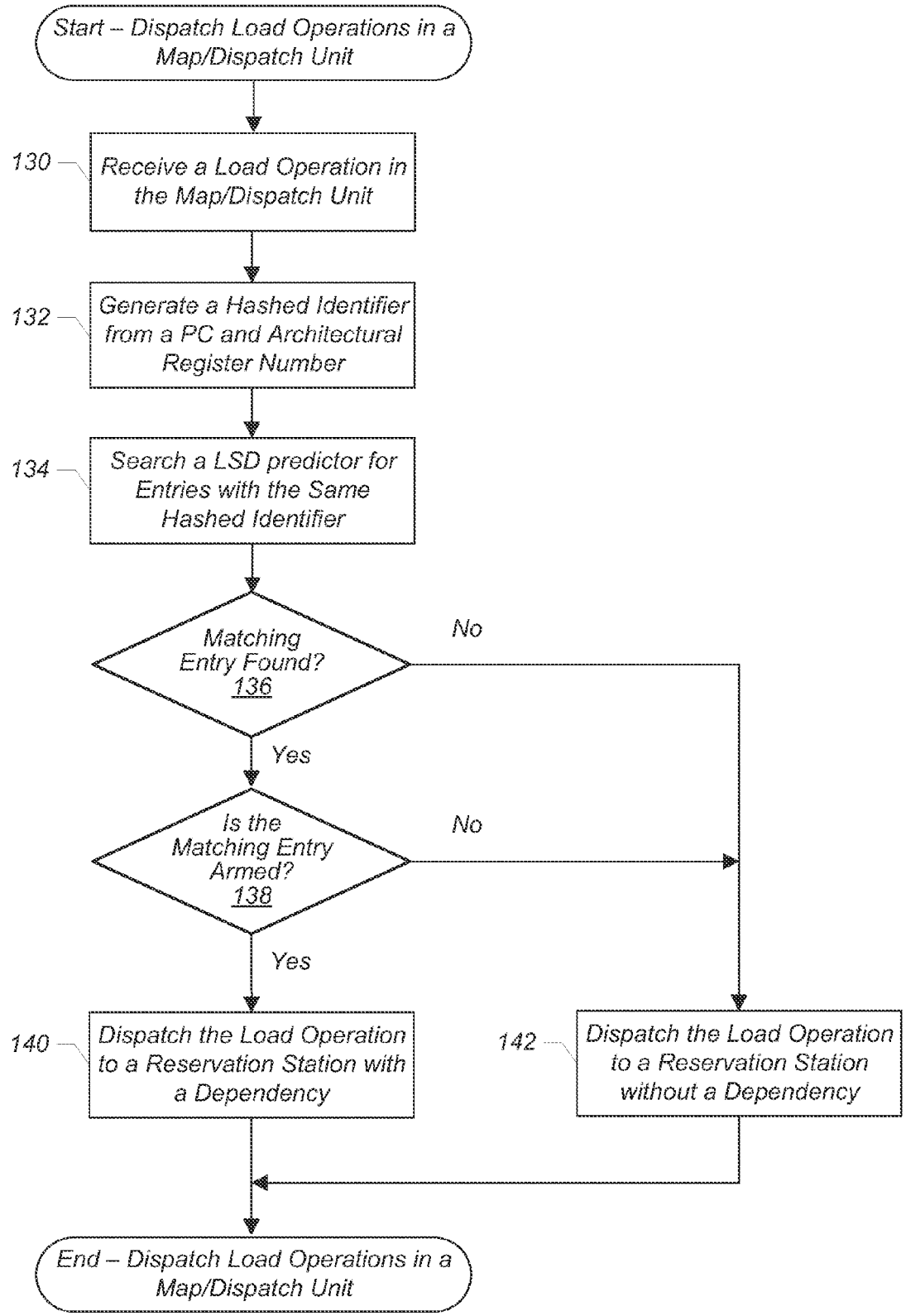
FIG. 7 is a generalized flow diagram illustrating one embodiment of a method for dispatching load operations in a map/dispatch unit.

Referring now to FIG. 7, one embodiment of a method for dispatching load operations in a map/dispatch unit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Furthermore, elements of the flowchart may be performed in parallel to allow multiple load operations to be dispatched simultaneously.

In one embodiment, a load operation may be received by a map/dispatch unit (block 130). The load operation may have been fetched and decoded in one or more prior stages of a processor pipeline. Next, a hashed identifier may be generated from the PC and the architectural register number of the load operation (block 132). In one embodiment, the PC and the destination architectural register number may be used to create the hashed identifier. Then, the load-store dependency (LSD) predictor may be searched for entries with the same hashed identifier as the given load operation (block 134). If a matching entry is found (conditional block 136), and the matching entry is armed (conditional block 138), then the load operation may be dispatched to a reservation station with a dependency (block 140). When a load operation is dispatched with a dependency, a store RNUM and the index number of the matching entry in the LSD predictor may be sent to the reservation station with the load. If an entry is not found (conditional block 136) or the matching entry is not armed (conditional block 138), then the load operation may be dispatched to a reservation station without a dependency (block 142). After block 140, if a load operation is dispatched to a reservation station with a dependency, the load may wait to issue until the corresponding store upon which it is dependent issues.

Figure 8:
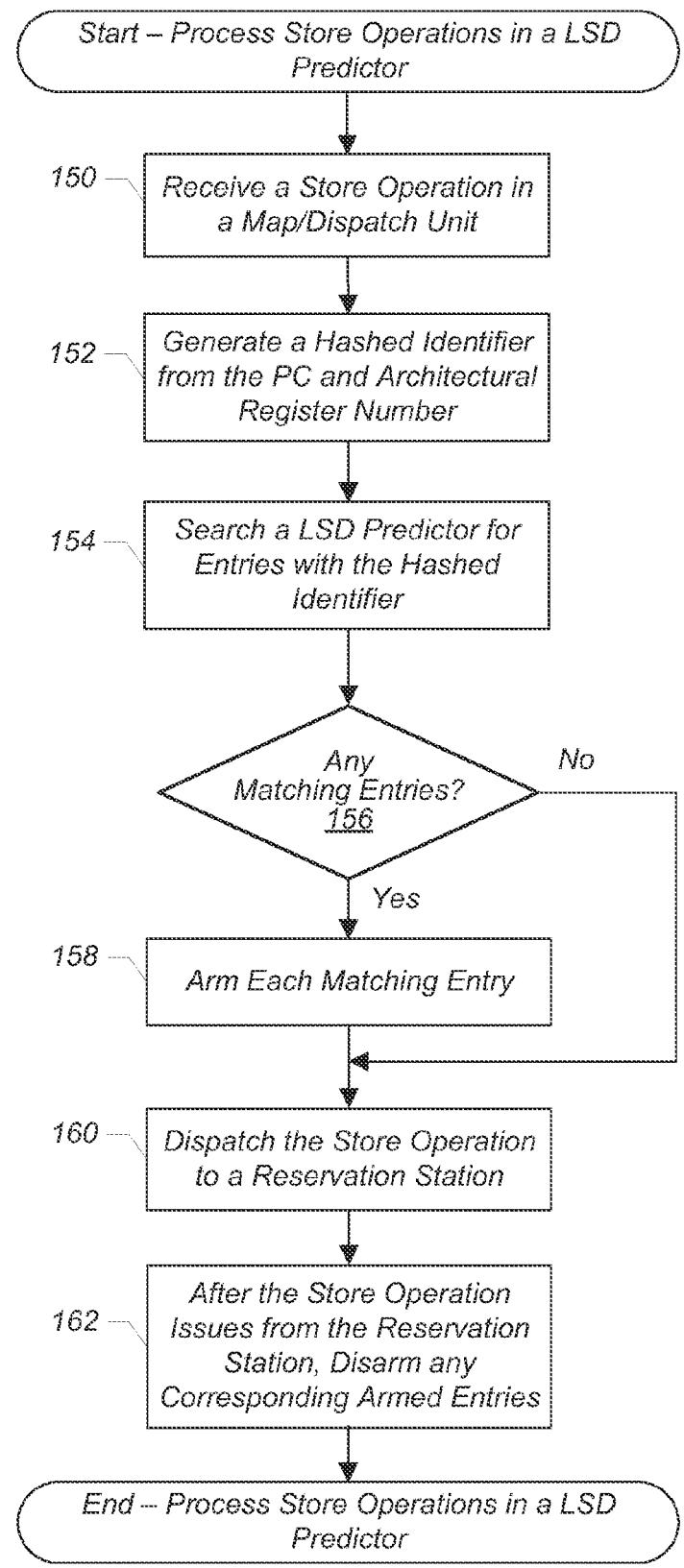
FIG. 8 is a generalized flow diagram illustrating one embodiment of a method for processing store operations in a load-store dependency predictor.

Turning now to FIG. 8, one embodiment of a method for processing store operations in a load-store dependency (LSD) predictor is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Furthermore, elements of the flowchart may be performed in parallel to allow multiple store operations to be processed simultaneously.

In one embodiment, a store operation may be received by a map/dispatch unit (block 150). The store operation may have been fetched and decoded in prior stage(s) of a processor pipeline. Next, a hashed identifier may be generated from the PC and the architectural register number of the store operation (block 152). In one embodiment, the PC and the source architectural register number may be used to create the hashed identifier. Then, a load-store dependency (LSD) predictor may be searched for entries with the same hashed identifier as the given store operation (block 154). If any matching entries are found (conditional block 156), then each matching entry may be armed (block 158). If no matching entries are found (conditional block 156), then the LSD predictor may remain unchanged, and the given store operation may be dispatched to the reservation station (block 160). After block 160, when the given store operation issues from the reservation station, any armed entries that were armed by the given store operation may be disarmed (block 162).

Figure 9:
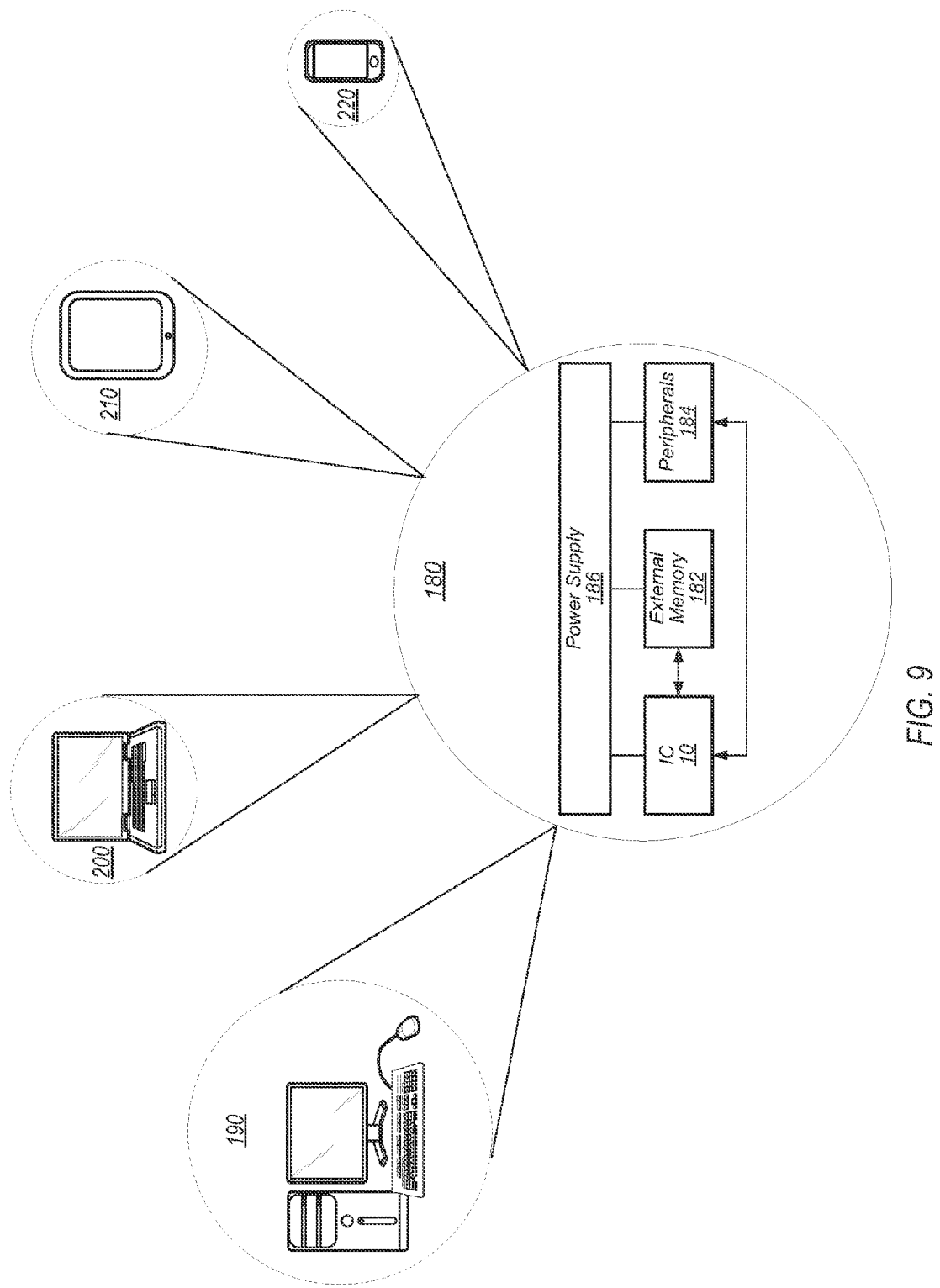
FIG. 9 is a block diagram of one embodiment of a system.

Referring next to FIG. 9, a block diagram of one embodiment of a system 180 is shown. As shown, system 180 may represent chip, circuitry, components, etc., of a desktop computer 190, laptop computer 200, tablet computer 210, cell phone 220, or otherwise. In the illustrated embodiment, the system 180 includes at least one instance of IC 10 (of FIG. 1) coupled to an external memory 182.

IC 10 is coupled to one or more peripherals 184 and the external memory 182. A power supply 186 is also provided which supplies the supply voltages to IC 10 as well as one or more supply voltages to the memory 182 and/or the peripherals 184. In various embodiments, power supply 186 may represent a battery (e.g., a rechargeable battery in a smart phone, laptop or tablet computer). In some embodiments, more than one instance of IC 10 may be included (and more than one external memory 182 may be included as well).

The memory 182 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 88 in a chip-on-chip configuration, a package-on-package configuration, or a multi-chip module configuration.

The peripherals 184 may include any desired circuitry, depending on the type of system 180. For example, in one embodiment, peripherals 184 may include devices for various types of wireless communication, such as wifi, Bluetooth, cellular, global positioning system, etc. The peripherals 184 may also include additional storage, including RAM storage, solid state storage, or disk storage. The peripherals 184 may include user interface devices such as a display screen, including touch display screens or multitouch display screens, keyboard or other input devices, microphones, speakers, etc.

Figure 10:
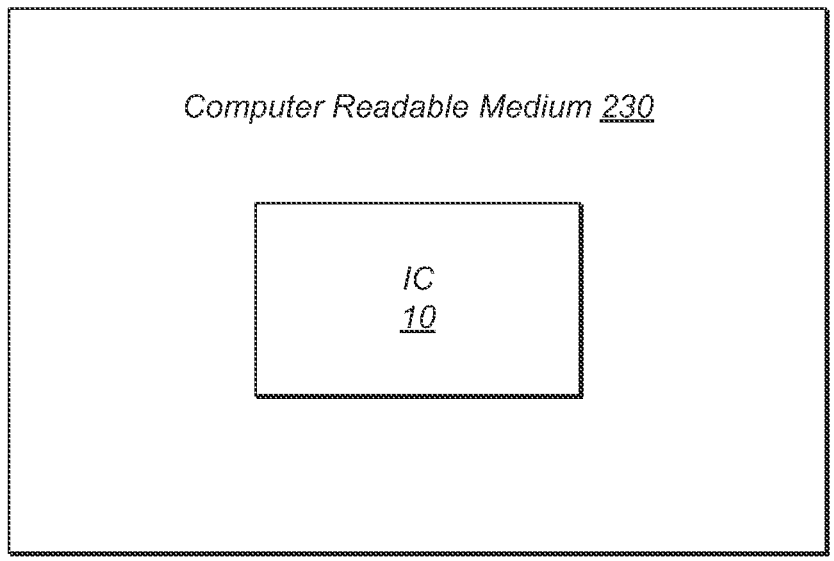
FIG. 10 is a block diagram of one embodiment of a computer readable medium.

Turning now to FIG. 10, one embodiment of a block diagram of a computer readable medium 230 including one or more data structures representative of the circuitry included in IC 10 (of FIG. 1) is shown. Generally speaking, computer readable medium 230 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 230 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 230 includes a representation of IC 10, other embodiments may include a representation of any portion or combination of portions of IC 10 (e.g., LSD predictor 37, LSU 46).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of entries, each of said entries being configured to store an identifier; and
   circuitry comprising a first hashing stage and a second hashing stage, wherein the circuitry is configured to:
      hash in the first hashing stage a portion of a program counter (PC) value of a given operation with at least a portion of a corresponding architectural register number or a micro-op number to produce an intermediate result, wherein the circuitry is configurable to switch between using the corresponding architectural register number or the micro-op number to produce the intermediate result; and
      hash in the second hashing stage at least a portion of the intermediate result with a portion of the PC value of the given operation, the corresponding architectural register number, and the micro-op number to produce a first identifier;
      store the first identifier in an entry of the plurality of entries; and
      predict a first operation is dependent on a second operation based at least in part on the first operation having a second identifier that matches the first identifier stored in said entry of the plurality of entries.

2. The load-store dependency predictor as recited in claim 1, wherein the given operation is a load operation and the architectural register number is a destination architectural register number of the load operation.

3. The load-store dependency predictor as recited in claim 1, wherein the first operation is a load operation and the second operation is a store operation.

4. The load-store dependency predictor as recited in claim 1, wherein each of said entries is configured to store both a load identifier and a store identifier, wherein the first identifier in said entry is a load identifier and an identifier of the second operation is stored in said entry as a store identifier.

5. The load-store dependency predictor as recited in claim 1, wherein each of said entries is configured to store a valid indicator that indicates whether a corresponding entry is valid.

6. A processor comprising:
circuitry comprising a first hashing stage and a second hashing stage, wherein the circuitry is configured to:
hash in the first hashing stage a portion of a program counter (PC) value of a given operation with at least a portion of a corresponding architectural register number or a micro-op number to produce an intermediate result, wherein the circuitry is configurable to switch between using the corresponding architectural register number or the micro-op number to produce the intermediate result; and
hash in the second hashing stage at least a portion of the intermediate result with a portion of the PC value of the given operation, the corresponding architectural register number, and the micro-op number to produce a first identifier; and
store the first identifier in an entry of a plurality of entries;
a load-store dependency predictor comprising said plurality of entries, each of said entries being configured to store an identifier generated by the circuitry; and
circuitry configured to:
predict a first operation is dependent on a second operation based at least in part on the first operation having a second identifier that matches the first identifier stored in said entry of the plurality of entries.

7. The processor as recited in claim 6, wherein the given operation is a load operation and the architectural register number is a destination architectural register number of the load operation.

8. The processor as recited in claim 6, wherein the first operation is a load operation and the second operation is a store operation.

9. The processor as recited in claim 6, wherein each of said entries is configured to store both a load identifier and a store identifier, wherein the first identifier in said entry is a load identifier and an identifier of the second operation is stored in said entry as a store identifier.

10. The processor as recited in claim 6, wherein each of said entries is configured to store a valid indicator that indicates whether a corresponding entry is valid.

11. A method comprising:
generating a first identifier, wherein the first identifier is generated by circuitry comprising a plurality of hashing stages, wherein
a first hashing stage of the plurality of hashing stages is configured to hash a first portion of a program counter (PC) value of a given operation with at least a portion of a corresponding architectural register number or a micro-op number to produce an intermediate result, wherein the first hashing stage is configurable to switch between using the corresponding architectural register number or the micro-op number to produce the intermediate result, and wherein
a second hashing stage of the plurality of hashing stages is configured to hash at least a portion of the intermediate result with a portion of the PC value of the given operation, the corresponding architectural register number, and the micro-op number to produce the first identifier;
storing the first identifier by the circuitry in an entry of a plurality of entries of a load-store dependency predictor; and
predicting by circuitry a first operation is dependent on a second operation based at least in part on the first operation having a second identifier that matches the first identifier stored in said entry of the plurality of entries.

12. The method as recited in claim 11, wherein the given operation is a load operation and the architectural register number is a destination architectural register number of the load operation.

13. The method as recited in claim 11, wherein the first operation is a load operation and the second operation is a store operation.

14. The method as recited in claim 11, wherein each of said entries is configured to store both a load identifier and a store identifier, wherein the first identifier in said entry is a load identifier and an identifier of the second operation is stored in said entry as a store identifier.

15. The method as recited in claim 11, wherein each of said entries is configured to store a valid indicator that indicates whether a corresponding entry is valid.

* * * * *